(12) United States Patent
Chun et al.

(10) Patent No.: US 8,622,418 B2
(45) Date of Patent: Jan. 7, 2014

(54) METHOD FOR MANUFACTURING KNEE AIRBAG CUSHION

(71) Applicant: Autoliv Development AB, Vargarda (SE)

(72) Inventors: Jeong-Hyun Chun, Gunpo-si (KR); Do-Gwan Kim, Osan-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/782,231

(22) Filed: Mar. 1, 2013

(65) Prior Publication Data

US 2013/0313810 A1  Nov. 28, 2013

(30) Foreign Application Priority Data

Mar. 5, 2012  (KR) .......................... 10-2012-0022478

(51) Int. Cl.
*B60R 21/16* (2006.01)

(52) U.S. Cl.
USPC ....................................... 280/730.1

(58) Field of Classification Search
USPC ............................ 280/730.1, 743.1
See application file for complete search history.

(56) References Cited

U.S. PATENT DOCUMENTS

| | | | |
|---|---|---|---|
| 3,951,427 A | 4/1976 | Wilfert | |
| 4,053,130 A | 10/1977 | Birkner | |
| 4,759,568 A | 7/1988 | Paefgen et al. | |
| 4,948,168 A | 8/1990 | Adomeit et al. | |
| 5,195,776 A | 3/1993 | Sakakida et al. | |
| 5,797,620 A | 8/1998 | Eyrainer | |
| 5,857,726 A | 1/1999 | Yokoyama et al. | |
| 5,865,468 A | 2/1999 | Hur | |
| 5,895,069 A | 4/1999 | Heilig et al. | |
| 5,971,431 A | 10/1999 | Wohllebe et al. | |
| 6,276,713 B1 | 8/2001 | Duletzke | |
| 6,322,122 B2 | 11/2001 | Burns et al. | |
| 6,398,256 B1 | 6/2002 | Saito | |
| 6,435,548 B2 | 8/2002 | Suzuki et al. | |
| 6,464,246 B2 | 10/2002 | Bayley | |
| 6,464,255 B1 | 10/2002 | Preisler et al. | |
| 6,536,802 B1 | 3/2003 | Sutherland et al. | |
| 6,575,495 B2 | 6/2003 | Calder | |
| 6,715,789 B2 | 4/2004 | Takimoto et al. | |
| 6,910,714 B2 | 6/2005 | Browne et al. | |

(Continued)

FOREIGN PATENT DOCUMENTS

| | | |
|---|---|---|
| DE | 19749585 A1 | 5/1999 |
| DE | 19946477 A1 | 3/2001 |

(Continued)

*Primary Examiner* — Faye M. Fleming
(74) *Attorney, Agent, or Firm* — Harness, Dickey & Pierce, P.L.C.

(57) ABSTRACT

A method for manufacturing a knee airbag cushion includes (a) preparing a panel having first and second panel surface parts and a virtual central line interposed between the first and second panel surface parts and is configured such that a distance from the virtual central line to the first panel surface part is different from a distance from the virtual central line to the second panel surface part, (b) folding the first panel surface part, (c) connecting portions of the first and second panel surface parts to each other, (d) folding an area of the virtual central line in the folding direction, and (e) forming a third sewing line to connect the first panel surface part to the second panel surface part.

8 Claims, 8 Drawing Sheets

(56) References Cited

U.S. PATENT DOCUMENTS

| | | | |
|---|---|---|---|
| 7,159,901 B2 | 1/2007 | Wang et al. | |
| 7,261,318 B2 | 8/2007 | Enders | |
| 7,314,231 B2 | 1/2008 | Abe et al. | |
| 7,434,837 B2 * | 10/2008 | Hotta et al. | 280/743.2 |
| 7,641,223 B2 | 1/2010 | Knowlden | |
| 7,681,908 B2 | 3/2010 | Fukawatase et al. | |
| 7,766,374 B2 | 8/2010 | Abele et al. | |
| 7,850,198 B2 | 12/2010 | Hayakawa et al. | |
| 7,883,112 B2 * | 2/2011 | Wold et al. | 280/743.1 |
| 7,891,726 B2 | 2/2011 | Gavrilov | |
| 7,954,845 B2 * | 6/2011 | Moritani | 280/730.1 |
| 7,963,550 B2 * | 6/2011 | Hong et al. | 280/730.1 |
| 2002/0130529 A1 | 9/2002 | Takano | |
| 2002/0171231 A1 | 11/2002 | Takimoto et al. | |
| 2003/0057692 A1 | 3/2003 | Horsch et al. | |
| 2004/0201209 A1 | 10/2004 | Schwark et al. | |
| 2005/0052009 A1 | 3/2005 | Abe | |
| 2005/0052011 A1 | 3/2005 | Best et al. | |
| 2005/0062264 A1 | 3/2005 | Arwood et al. | |
| 2005/0151351 A1 | 7/2005 | Enders et al. | |
| 2005/0194767 A1 | 9/2005 | Freisler et al. | |
| 2006/0022440 A1 | 2/2006 | Umehara | |
| 2007/0126212 A1 | 6/2007 | Takimoto et al. | |
| 2007/0176473 A1 | 8/2007 | Sakai et al. | |
| 2008/0116669 A1 | 5/2008 | Adachi et al. | |
| 2008/0122204 A1 | 5/2008 | Fukawatase et al. | |
| 2008/0174091 A1 | 7/2008 | Hoshino et al. | |
| 2010/0066064 A1 | 3/2010 | Kotikovsky | |
| 2010/0102539 A1 | 4/2010 | Fukawatase et al. | |
| 2011/0006506 A1 | 1/2011 | Fukawatase et al. | |
| 2011/0109070 A1 | 5/2011 | Tanaka et al. | |
| 2011/0241319 A1 | 10/2011 | Chavez | |
| 2012/0007345 A1 | 1/2012 | Lee | |
| 2012/0049488 A1 | 3/2012 | Enders | |

FOREIGN PATENT DOCUMENTS

| | | |
|---|---|---|
| DE | 102004047332 A1 | 6/2005 |
| DE | 202006001826 U1 | 5/2006 |
| EP | 1431131 A1 | 6/2004 |
| GB | 2408027 A | 5/2005 |
| JP | 9123857 A | 5/1997 |
| JP | 2004067024 A | 3/2004 |
| JP | 2004-352119 A | 12/2004 |
| JP | 2005254904 A | 9/2005 |
| JP | 2007331655 A | 12/2007 |

* cited by examiner (a)

(b)

(c)

METHOD FOR MANUFACTURING KNEE AIRBAG CUSHION

CROSS-REFERENCE TO RELATED APPLICATIONS

This application claims the benefit and priority of Korean Patent Application No. 10-2012-0022478 filed 5 Mar. 2012. The entire disclosure of the above application is incorporated herein by reference.

FIELD

The present disclosure relates to a method for manufacturing a knee airbag cushion. In more particular, the present invention relates to a method for manufacturing a knee airbag cushion, capable of safely protecting the knee of an occupant by more rapidly upright-deploying an airbag cushion in an upper direction while reducing the manufacturing cost by simply manufacturing the airbag cushion.

BACKGROUND

This section provides background information related to the present disclosure which is not necessarily prior art.

In general, an airbag module is a device to protect an occupant in a vehicle by absorbing physical impact, which is caused upon vehicle collision, through the elasticity of an airbag cushion. The airbag module is installed at each part of the vehicle according to the need, and classified into a driver airbag module to protect a driver, a passenger airbag module to protect an occupant seated at a passenger seat, a curtain airbag module mounted along a roof rail to protect the side of an occupant, and a knee airbag module installed in an instrumental panel to protect the knee of the occupant.

Hereinafter, the deployment procedure of a knee airbag according to the related art will be described with reference to FIG. 1.

As shown in FIG. 1, when an inflator 11 is operated, an airbag cushion 10 of a low mounting knee airbag module is deployed in a lower direction (toward the floor inside a vehicle) and then laterally deployed toward the shin of the occupant. Thereafter, after the airbag cushion 10 moves up along the shin of the occupant, the deployment of the airbag cushion 10 has been normally finished.

However, since the airbag cushion 10 according to the related art strikes the shin of the occupant as described above, the shin of the occupant, which is weaker for the impact than the knee of the occupant, is injured. In addition, since the airbag cushion 10 strikes the shin of the occupant and then is deployed upwardly, the airbag cushion 10 may be not deployed rapidly.

Accordingly, the technology of a knee airbag cushion more rapidly deployed upwardly to stably the knee of the occupant must be developed.

SUMMARY

This section provides a general summary of the disclosure, and is not a comprehensive disclosure of its full scope or all of its features.

Accordingly, the present invention has been made keeping in mind the above problems occurring in the prior art, and an object of the present invention is to provide a method for manufacturing a knee airbag cushion, capable of protecting the knee of an occupant by more rapidly upright-deploying the airbag cushion upwardly.

Another object of the present invention is to provide a method for manufacturing a knee airbag cushion, capable of rapidly upright-deploying the airbag cushion upwardly while saving the manufacturing cost by simply manufacturing the airbag cushion.

Objects of the present invention may not be limited to the above, and other objects of the present invention will be apparently comprehended by those skilled in the art when making reference to embodiments in the following description.

Technical Solution

According to the present invention, there is provided a method for manufacturing a knee airbag cushion. The method includes (a) preparing a panel which has first and second panel surface parts and a virtual central line interposed between the first and second panel surface parts and is configured such that a distance from the virtual central line to the first panel surface part is different from a distance from the virtual central line to the second panel surface part, (b) folding the first panel surface part in one direction with respect to the virtual central line, (c) connecting portions of the first and second panel surface parts to each other at both sides of a peripheral portion of the virtual central line to form first and second sewing lines, (d) folding an area of the virtual central line in an upper direction identical to a folding direction in step (b), and (e) forming a third sewing line to connect the first panel surface part to the second panel surface part while overlapping with at least one of the first and second sewing lines formed in step (c).

In this case, in step (c), first sewing line are spaced apart from left and right edges of the first and second panel surface parts by a predetermined distance while extending from the virtual central line by a predetermined distance, and second sewing line connected to both edges of the first panel surface part and the second panel surface part in a state that the second sewing line are inclined with respect to the end portions of the first sewing line.

In step (a), each of the first and second panel surface parts includes a flap extending in a lateral direction from both edges of the peripheral portion of the virtual central line, and the second sewing line is formed in the flap.

A folding line is formed through step (d), and the second sewing line is provided at an edge of the flap such that the second sewing line is spaced apart from the folding line, which is formed in step (d), as far as possible in step (e).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7:
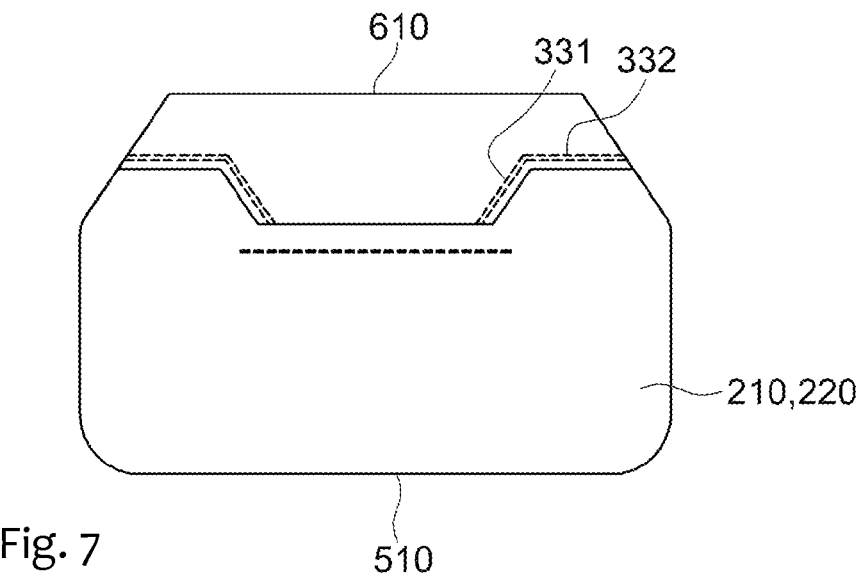
Figure 8:
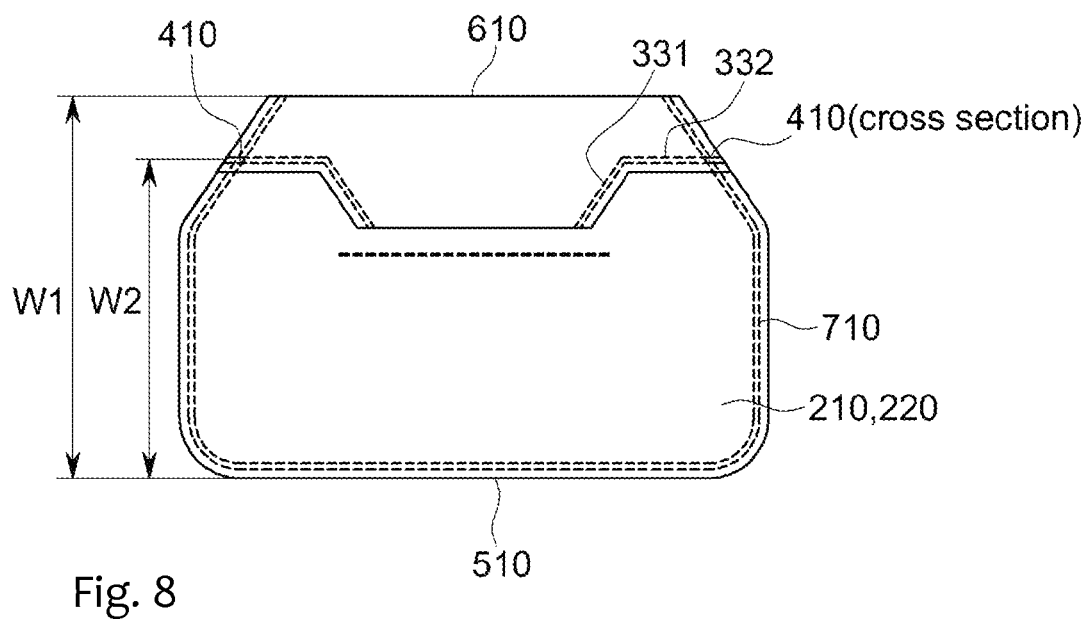
Figure 9:
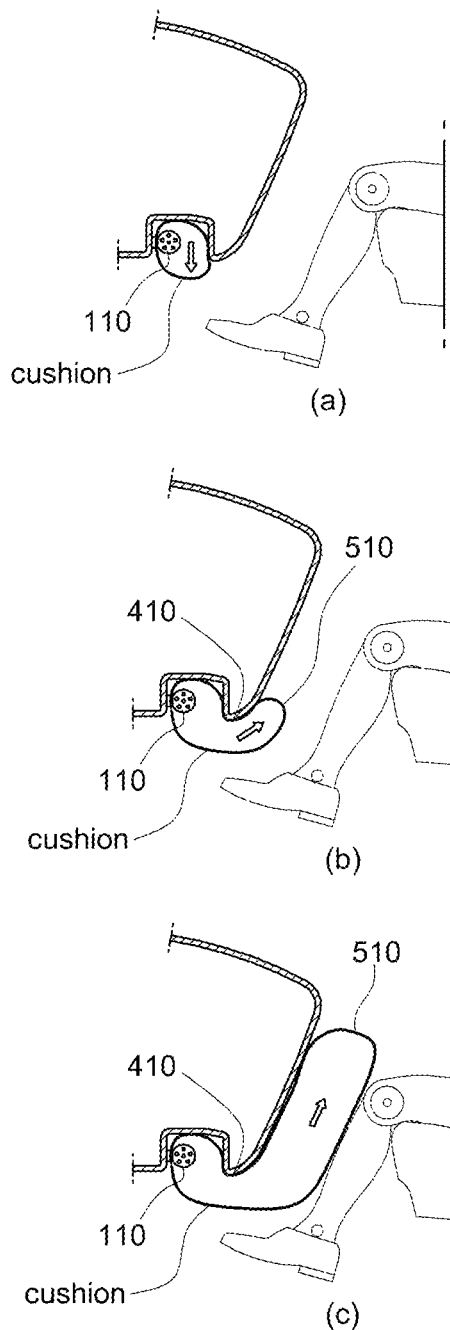

FIGS. 3 to 8 are views sequentially showing the manufacturing process of the airbag cushion through the method for manufacturing the knee airbag cushion according to one embodiment of the present invention; and FIG. 9 illustrates views showing the deployment procedure of the airbag cushion manufactured through the method for manufacturing the knee airbag cushion according to one embodiment of the present invention.

Corresponding reference numerals indicate corresponding parts throughout the several views of the drawings.

DETAILED DESCRIPTION

Example embodiments will now be described more fully with reference to the accompanying drawings.

As described above, according to the embodiment of the present invention, the airbag cushion can be simply manufactured to save the manufacturing cost and can be rapidly upright-deployed upwardly, so that the knee of the occupant can be stably protected.

Effects of the present invention may not be limited to the above, and other objects of the present invention will be apparently comprehended by those skilled in the art when making reference to embodiments in the following description.

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention. The same reference numerals will be used to refer to the same elements.

Figure 1:
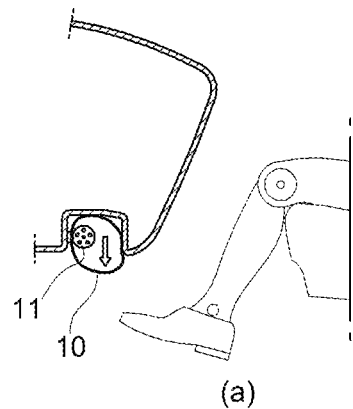
FIG. 1 illustrates views showing the deployment of a knee airbag cushion according to the related art.
Figure 1:
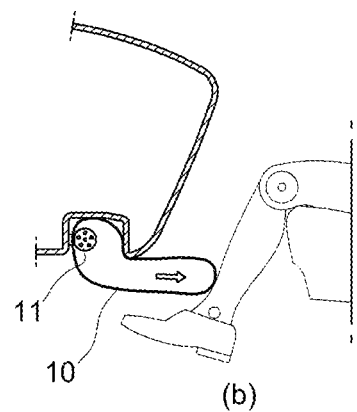
Figure 1:
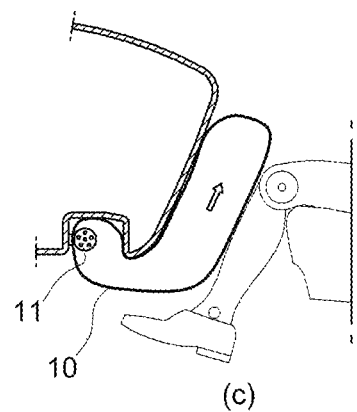
Figure 2:
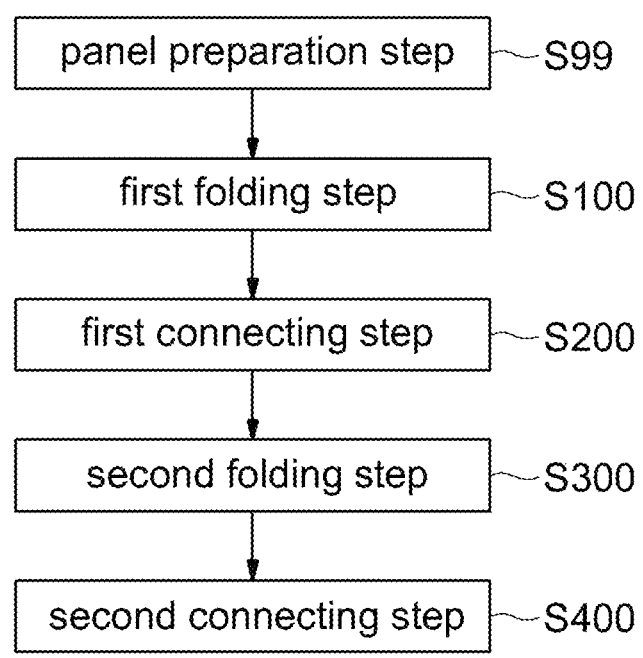
FIG. 2 is a flowchart showing a method for manufacturing a knee airbag cushion according to one embodiment of the present invention.

FIG. 2 is a flowchart showing a method for manufacturing a knee airbag cushion according to one embodiment of the present invention, FIGS. 3 to 8 are views sequentially showing the manufacturing process of the airbag cushion through the method for manufacturing the knee airbag cushion according to one embodiment of the present invention, and FIG. 9 illustrates views showing the deployment procedure of the airbag cushion manufactured through the method for manufacturing the knee airbag cushion according to one embodiment of the present invention.

In the method (hereinafter, manufacturing method) for manufacturing the knee airbag cushion according to one embodiment of the present invention, a knee airbag cushion constituting a low mounting knee airbag module is manufactured. In more detail, according to the present embodiment, when an inflator is operated, the knee airbag cushion is not sagged, but deployed in an upper direction. In other words, the knee airbag cushion can be more rapidly deployed in the upright state. Therefore, the present embodiment has an advantage in that the knee of the occupant can be more stably protected.

The manufacturing method according to the present embodiment includes (a) a step of preparing a panel 200 which has first and second panel surface parts 210 and 220 and a virtual central line 310 interposed between the first and second panel surface parts 210 and 220 and is configured in such a manner that a distance from the virtual central line 310 to the first panel surface part 210 is different from a distance from the virtual central line 310 to the second panel surface part 220, (step S99), (b) a first folding step of folding the first panel surface part 210 in one direction with respect to the virtual central line 310 (step S100), (c) a first connecting step of connecting portions of the first and second panel surface parts 210 and 220 to each other at both sides of a peripheral portion of the virtual central line 310 to form first and second sewing lines 331 and 332 (step S200), (d) a second folding step of folding an area of the virtual central line 310 in the upper direction the same as the folding direction in step (b) (step S300), and (e) a second connecting step of forming a third sewing line 710 to connect the first panel surface part 210 with the second panel surface part 220 while overlapping with at least one of the first and second sewing lines 331 and 332 formed in step (c).

Figure 3:
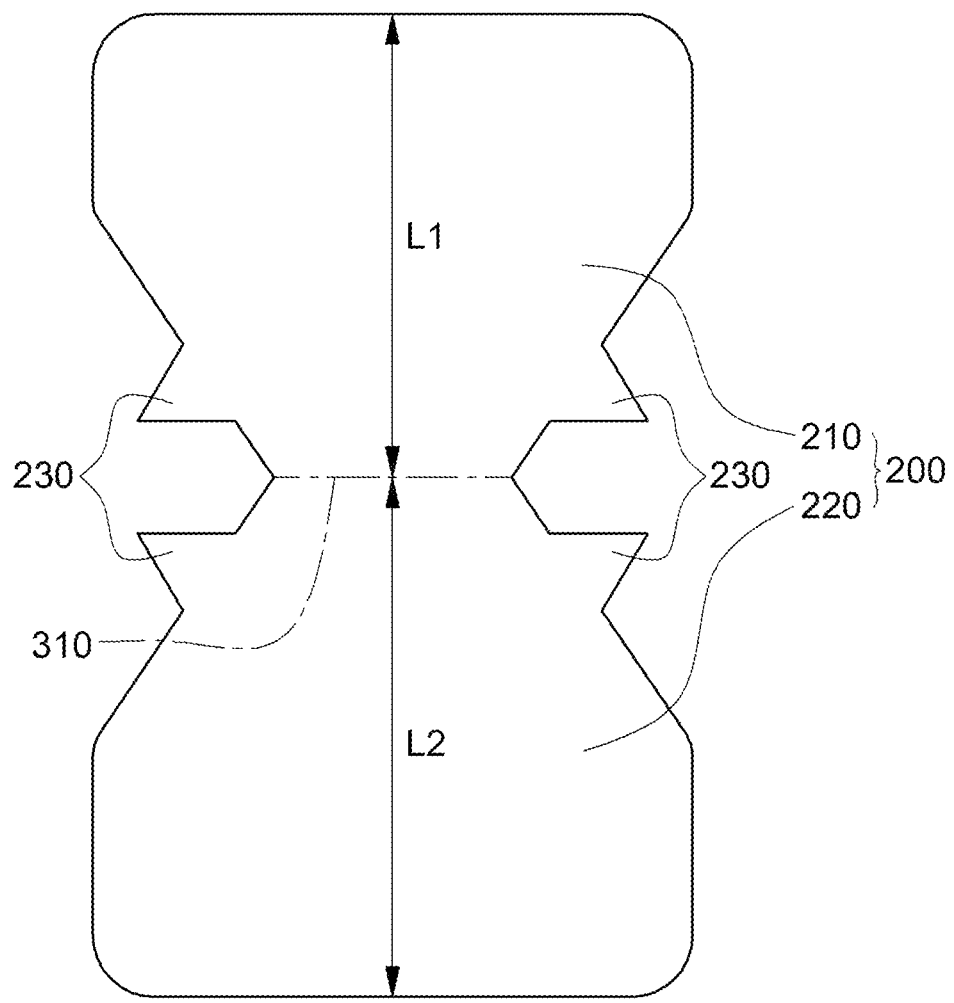

First, the panel 200 is cut out in the shape shown in FIG. 3, and prepared (step S99). In this case, the first and second panel surface parts 210 and 220 preferably include flaps 230 extending in the lateral direction from both edges of the peripheral portion of the virtual central line 310. In this case, a distance L1 from the virtual central line 310 to a distal end of the first panel surface part 210 is different from a distance L2 from the virtual central line 310 to a distal end of the second panel surface part 220. According to the present embodiment, for example, the distance L2 may be longer than the distance L1.

Figure 4:
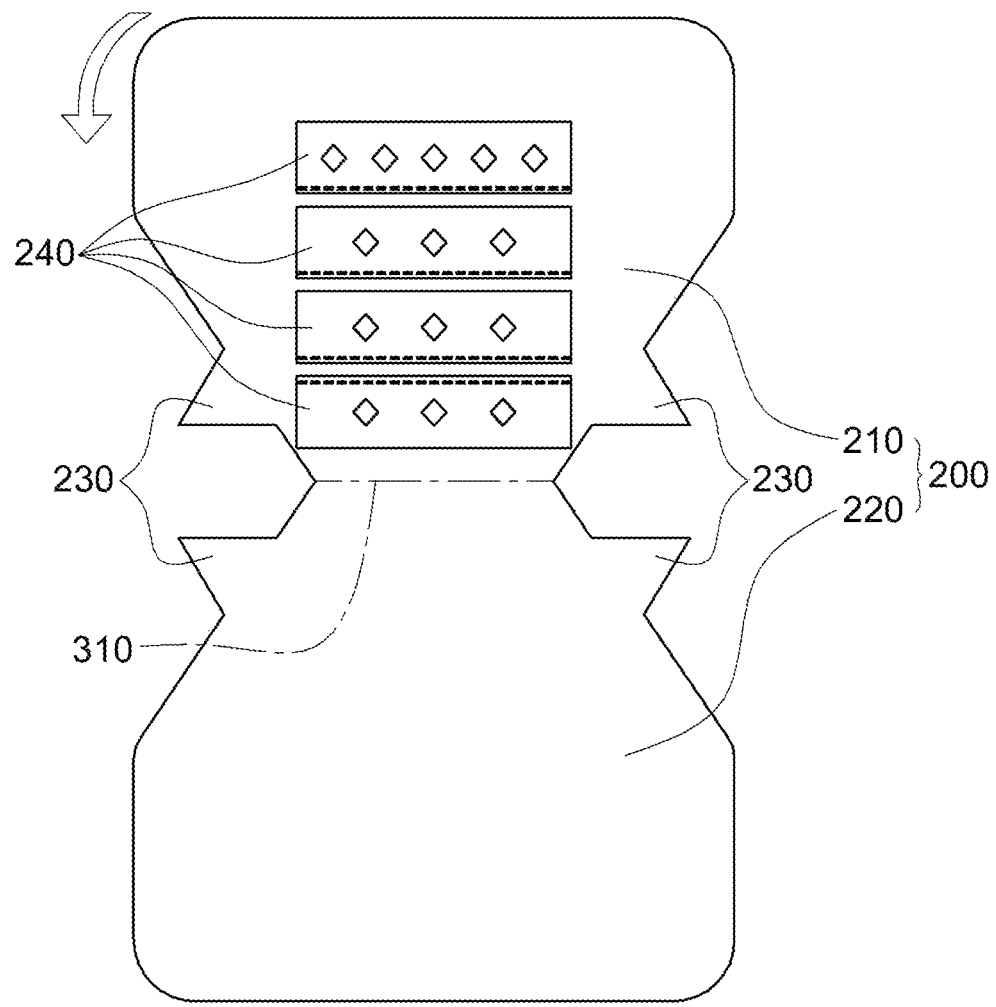

Next, as shown in FIG. 4, a step of connecting one side of a tether 240 to one of the first and second panel surface parts 210 and 220 is further provided. In this case, the tether 240 maintains the deployment shape of the airbag cushion. The structure of the tether 240 can be sufficiently comprehended by those skilled in the art, and the details thereof will be omitted. The tether 240 may be connected through a sewing scheme or by using an adhesive.

Figure 5:
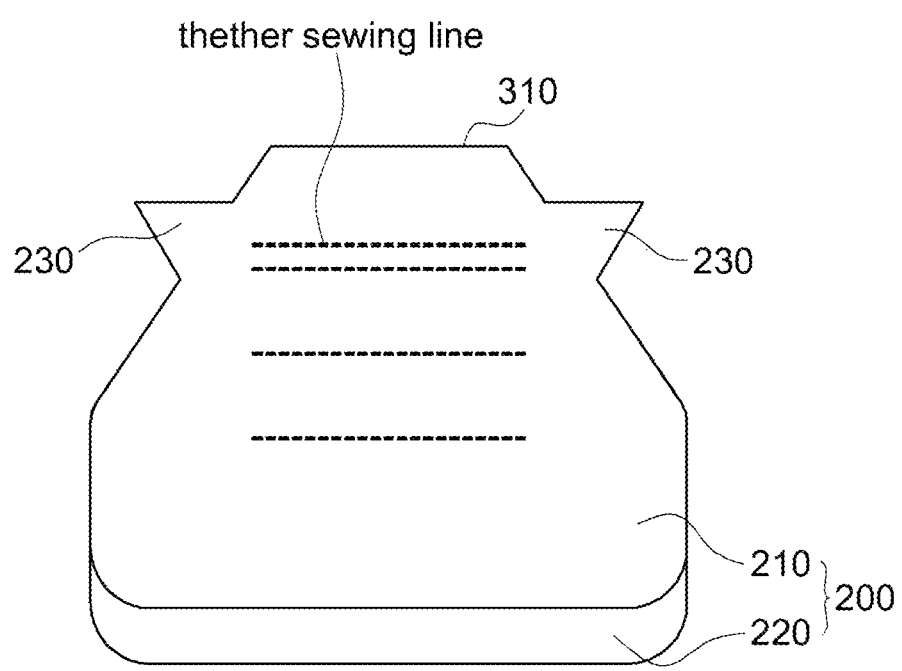

Thereafter, as shown in FIGS. 2 and 5, the panel 200, in detail, the first panel surface part 210 is folded in one direction about the virtual central line 310 (step S100). As shown in FIGS. 2 and 5, the first and second panel surface parts 210 and 220 are overlapped with each other asymmetrically to each other. In detail, the panel 200 is folded in such a manner that the distal ends of the first and second panel surface parts 210 and 220 facing the virtual central line 310 are provided at different positions.

Figure 6:
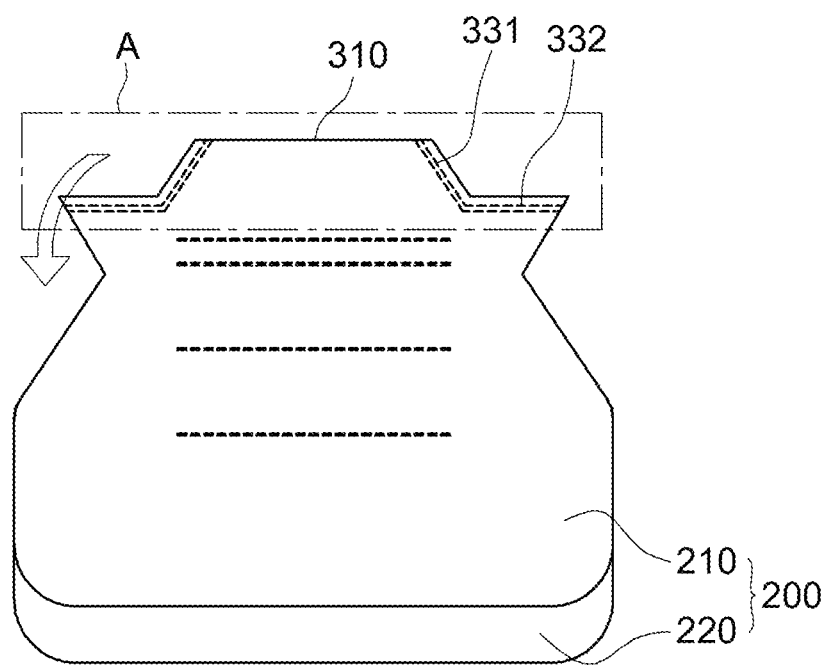

Thereafter, as shown in FIGS. 2 and 6, the first and second panel surface parts 210 and 220 are partially connected to each other at both sides of the peripheral portion of the virtual central line 310 (step S200). For example, in step 200, the first and second surface parts 210 and 220 may be connected to each other through a sewing scheme or by using an adhesive. Hereinafter, the first and second surface parts 210 and 220 connected to each other by using a sewing scheme will be described. In addition, in step S200, in a region A adjacent to the virtual central line 310, the first and second sewing lines 331 and 332 are formed at both edges of the peripheral portion of the first and second surface parts 210 and 220. In this case, to guide the more rapid upright deployment of the airbag cushion, one of the first and second panel surface parts 210 and 220 partially cross the third sewing line 710 formed in step S400 (cross-sewing) as described later, and the details thereof will be described below. In this case, the first to the third sewing lines 331, 332, and 710 are formed through an actual sewing work.

As shown in FIG. 6, first sewing line 331 are spaced apart from left and right edges of the first and second panel surface parts 210 and 220 by a predetermined distance while extending from the virtual central line 310 by a predetermined distance. In addition, the second sewing line 332 are inclined with respect to the end portions of the first sewing line 331 and connected to both edges of the first panel surface part 210 and the second panel surface part 220. According to the present embodiment, the second sewing line 332 is preferably formed in the flap 230.

Thereafter, as shown in FIGS. 2 and 7, an area of the virtual central line 310 is folded in the upper direction identical to the folding direction in step S100 (step S300). In this case, in step S300, different from step S100, the first and second panel surface parts 210 and 220 are folded in such a manner that the edges of the first and second panel surface parts 210 and 220 are overlapped with each other at the substantially same position, and a folding line 610 is formed about the folding portion.

Next, as shown in FIGS. 2 and 8, the first panel surface part 210 is connected to the second panel surface part 220. In detail, the first panel surface part 210 is connected to the second surface part 220 through a sewing scheme or by using an adhesive (step S400). Hereinafter, the first and second panel surface parts 210 and 220 connected to each other through the sewing scheme will be described.

In step S400, the first and second panel surface parts 210 and 220 are sewn in such a manner that an overlap part with the connection part (i.e., the second sewing line) in step S200 is partially formed. In detail, the third sewing line 710 is formed at the edges of the first and second panel surface parts 210 and 220 in step S400 so that the third sewing line 710 crosses the second sewing line 332. In addition, as shown in FIG. 8, in step S400, the second sewing line 332 is preferably provided at the edge of the flap 230 so that the second sewing line 332 is spaced apart from the folding line 610 formed in step S300 as far as possible.

As described above, the second sewing line 332 is inclined with respect to the first sewing line 331 while being formed in the flap 230, so that the position of the cross section between the second sewing line 332 and the third sewing line 710 formed in step S400 is closer to the deployment end portion 510 (the end portion of the airbag cushion upwardly farthest away from the floor of the vehicle in the state that the airbag cushion is fully deployed) as shown in FIG. 8. Accordingly, the distance between the deployment end portion 510 of the airbag cushion and the cross section 410 is decreased, so that the upright deployment effect of the airbag cushion can be more enhanced as shown in FIG. 9. In addition, the cross section 410 between the second sewing line 332 and the third sewing line 710 serves as a hinge point. As the cross section 410 is closer to the deployment end portion 510 of the airbag cushion as shown in FIG. 8, the airbag cushion can be more rapidly deployed uprightly.

In detail, as a distance W2 between the deployment end portion 510 of the airbag cushion and the cross section 410 is shorter than the distance W1 between the folding line 610 formed in step S300 and the deployment end portion 510 of the airbag cushion as shown in FIG. 8, the airbag cushion can be more rapidly deployed uprightly. In other words, when gas is injected into the airbag cushion, the cross section 410 serves as a hinge axis. As the distance between the hinge axis and the deployment end portion 510 of the airbag cushion is decreased, the airbag cushion is more rapidly deployed in the upright state as shown in FIG. 9.

For reference, a remaining end portion of the tether 240 may be connected to the first panel surface part 210 or the second panel surface part 220 after step S400 has been performed, or in the intermediate step between step S300 and step S400.

In summary, the present embodiment can be easily manufactured through a simple assembling process actually including twice folding steps and twice connecting (e.g., sewing) steps except for the cutting-out process. The airbag cushion having the simple structure, which has been manufactured through the above assembling process, not only can save the manufacturing cost, but can be more rapidly deployed in the upright state when the airbag cushion is deployed by the inflator 110 as shown in FIG. 9. Accordingly, the injury of the occupant knee can be minimized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a knee airbag cushion, the method comprising:
(a) preparing a panel having first and second panel surface parts and a virtual central line interposed between the first and second panel surface parts, a distance from the virtual central line to the first panel surface part being different from a distance from the virtual central line to the second panel surface part;
(b) folding the first panel surface part in a first direction with respect to the virtual central line;
(c) connecting portions of the first and second panel surface parts to each other at both sides of a peripheral portion of the virtual central line to form first and second sewing lines;
(d) folding an area of the virtual central line in a second direction, the second direction being identical to the first direction; and
(e) forming a third sewing line to connect the first panel surface part to the second panel surface part while overlapping with at least one of the first and second sewing lines.

2. The method of claim 1, wherein, in step (c), the first sewing line and the second sewing line are spaced apart from left and right edges of the first and second panel surface parts by a predetermined distance while extending from the virtual central line by a predetermined distance, and the second sewing line is connected to both edges of the first panel surface part and the second panel surface part in a state that the second sewing line is inclined with respect to end portions of the first sewing line.

3. The method of claim 2, wherein, in step (a), each of the first and second panel surface parts includes a flap extending in a lateral direction from both edges of the peripheral portion of the virtual central line, and the second sewing line is formed in the flap.

4. The method of claim 3, wherein a folding line is formed through step (d), and the second sewing line is provided at an edge of the flap such that the second sewing line is spaced apart from the folding line, which is formed in step (d), as far as possible in step (e).

5. A knee airbag cushion comprising:
a panel having first and second panel surface parts and a virtual central line interposed between the first and second panel surface parts, the panel configured such that a distance from the virtual central line to the first panel surface part is different from a distance from the virtual central line to the second panel surface part, the first panel surface part folded in a first direction with respect to the virtual central line, the first and second panel surface parts connected to each other at both sides of a peripheral portion of the virtual central line to form first and second sewing lines, an area of the virtual central line folded in a second direction identical to the first direction, a third sewing line connecting the first panel surface part to the second panel surface part while overlapping with at least one of the first and second sewing lines.

6. The knee airbag cushion of claim 5, wherein the first sewing line is spaced apart from left and right edges of the first and second panel surface parts by a predetermined distance while extending from the virtual central line by a predetermined distance, and the second sewing line is connected to both edges of the first panel surface part and the second panel surface part in a state that the second sewing line is inclined with respect to end portions of the first sewing line.

7. The knee airbag cushion of claim 6, wherein both of the first and second panel surface parts includes a flap extending in a lateral direction from both edges of the peripheral portion of the virtual central line, and the second sewing line is formed in the flap.

8. The knee airbag cushion of claim 7, wherein the area of the virtual center line includes a folding line through step (d), and the second sewing line is provided at an edge of the flap such that the second sewing line is spaced apart from the folding line.

* * * * *